United States Patent
Nozawa et al.

(10) Patent No.: US 8,801,417 B2
(45) Date of Patent: Aug. 12, 2014

(54) SHEET FORMING DIE AND SHEET FORMING METHOD

(75) Inventors: Kenji Nozawa, Numazu (JP); Masatsugu Tamura, Numazu (JP)

(73) Assignee: Toshiba Kikai Kabushiki Kaisha, Tokyo (JP)

(*) Notice: Subject to any disclaimer, the term of this patent is extended or adjusted under 35 U.S.C. 154(b) by 227 days.

(21) Appl. No.: 12/423,832

(22) Filed: Apr. 15, 2009

(65) Prior Publication Data
US 2009/0263529 A1  Oct. 22, 2009

(30) Foreign Application Priority Data

Apr. 16, 2008  (JP) .................................. 2008-106912

(51) Int. Cl.
*B29C 47/06* (2006.01)
*B29C 47/86* (2006.01)

(52) U.S. Cl.
USPC .................. 425/133.5; 425/379.1; 425/382.4; 425/462

(58) Field of Classification Search
USPC .............. 425/133.5, 378.1, 379.1, 382.4, 462
See application file for complete search history.

(56) References Cited

U.S. PATENT DOCUMENTS

| | | | | |
|---|---|---|---|---|
| 3,557,262 A | * | 1/1971 | Mitchell et al. | 264/37.32 |
| 3,647,344 A | * | 3/1972 | Skibo et al. | 425/379.1 |
| 3,901,636 A | * | 8/1975 | Zink et al. | 425/378.1 |
| 4,272,312 A | * | 6/1981 | Thompson | 156/244.11 |
| 6,971,865 B2 | * | 12/2005 | Prue | 425/192 R |
| 2007/0184142 A1 | * | 8/2007 | Prue | 425/192 R |
| 2008/0157424 A1 | * | 7/2008 | Fujii et al. | 264/171.15 |
| 2009/0035410 A1 | | 2/2009 | Mizunuma et al. | |

FOREIGN PATENT DOCUMENTS

| | | |
|---|---|---|
| EP | 1 829 666 | 9/2007 |
| JP | 06-91719 | 4/1994 |
| JP | 2000-127227 | 5/2000 |

(Continued)

OTHER PUBLICATIONS

English Abstract of KR 2007-0121780 published Dec. 27, 2007.

(Continued)

*Primary Examiner* — Dimple Bodawala
*Assistant Examiner* — Joseph Leyson
(74) *Attorney, Agent, or Firm* — DLA Piper LLP (US)

(57) ABSTRACT

Provided is a sheet forming die capable of finely controlling the flow rates of the respective divided flows of a molten resin with precision. The sheet forming die is a sheet forming die 3 configured to: receive a first molten resin B; to receive a second molten resin A; and to thus form a sheet-shaped resin-made product by discharging the molten resins A, B from a lip gap 15. The sheet forming die 3 includes: a first passage 17 provided to flow the supplied first molten resin B up to an upstream end of a lip part 23 located upstream of the lip gap 15; a second passage 19 provided to flow the supplied second molten resin A up to the lip part 23, the second passage branching out into a plurality of passageways 19A, 19B in a midstream portion thereof, downstream ends of these passageways 19A, 19B being connected to portions in an upstream end of the lip part 23, respectively; and temperature controller 21 configured to locally control a temperature of a midstream portion of at least one of the passageways 19A, 19B in order to control a flow rate of the second molten resin A in the passageways 19A, 19B.

2 Claims, 4 Drawing Sheets

(56) References Cited

FOREIGN PATENT DOCUMENTS

| JP | 2003-191310 | 7/2003 |
|----|-------------|--------|
| JP | 2005-246607 | 9/2005 |
| JP | 2006-231788 | 9/2006 |
| JP | 2007-210122 | 8/2007 |
| KR | 2007-0106992 | 11/2007 |
| KR | 2007-0121780 | 12/2007 |

OTHER PUBLICATIONS

English Abstract of KR 2007-0106992 published Nov. 6, 2007.
Office Action issued in KR Appl 10-2009-32551 on Feb. 10, 2011.
English Translation of Office Action issued in KR Appl 10-2009-32551 on Feb, 10, 2011.
Japanese Office Action issued in JP 2008-106912 on Jun. 25, 2013.
English Translation of Japanese Office Action issued in JP 2008-106912 on Jun. 25, 2013.
English Language Abstract of JP 2005-246607 publisehd Sep. 15, 2005.
English Language Translation of JP 2005-246607 publisehd Sep. 15, 2005.
English Language Abstract of JP 2003-191310 published Jul. 8, 2003.
English Language Translation of JP 2003-191310 published Jul. 8, 2003.
English Language Abstract of JP 2000-127227 published May 9, 2000.
English Language Translation of JP 2000-127227 published May 9, 2000.
English Language Abstract of JP 2007-210122 published Aug. 23, 2007.
English Language Translation of JP 2007-210122 published Aug. 23, 2007.
English Abstract of JP-06-91719, published Apr. 5, 1994.
English Abstract of JP-2006-231788, published Sep. 7, 2006.
English Language translation of JP-06-91719, published Apr. 5, 1994.
English Language translation of JP-2006-231788, published Sep. 7, 2006.

* cited by examiner

SHEET FORMING DIE AND SHEET FORMING METHOD

BACKGROUND OF THE INVENTION

1. Field of the Invention

The present invention relates to a sheet forming die and a sheet forming method. The present invention relates for example to a die and a method for forming a sheet by dividing a supplied molten resin into flows, and thereafter by joining the divided flows of the molten resin together.

2. Description of the Related Art

There has been known a method for manufacturing a laminated film formed of a number of thermoplastic resin layers by co-extrusion lamination using a multi-manifold die. By this method, the film to be laminated is expanded to a standard width, and thereafter the two side edge portions of the film are coated in the die with a single resin. For this method, there has been known a multi-manifold die including side plates which are provided on its two respective sides. In addition, the multi-manifold die includes a resin passage and a resin discharge port which are drilled in each of the side plates. The resin passage branches from, and communicates with, one of its resin inflow ports. The resin discharge port is configured to discharge the resin for coating the two side edge portions of the laminated film, as disclosed in the Japanese Patent Brochure, Japanese Patent Application Laid-Open No. Hei. 6-91719, for instance.

In the method employing the conventional multi-manifold die, the film is expanded to the standard width and then the two side edge portions of the film are encapsulated in the die with the resin. Accordingly, this poses a problem in that the resin to coat the two side edge portions may not smoothly flow to join together with the film at the resin passage outlets (at locations where the resin flows to join together with the film expanded to the standard width), thereby making it difficult to finely control the flow rates of the flowing resin divided for coating the two side edge portions.

SUMMARY OF THE INVENTION

The present invention has been achieved with such points in mind.

It therefore is an object of the present invention to provide a sheet forming die capable of finely controlling with precision the flow rates of the divided flows of the molten resin, and a sheet forming method using this sheet forming die.

To achieve the object, according to a first aspect of the present invention, there is provided a sheet forming die: which receives a first molten resin supplied from a first resin extruder; which receives a second molten resin supplied from a second resin extruder; and which forms a sheet-shaped resin-made product by discharging the first molten resin and the second molten resin from a lip gap. The sheet forming die includes: a first passage provided to flow the supplied first molten resin up to an upstream end of a lip part located upstream of the lip gap; a second passage provided to flow the supplied second molten resin up to the lip part, the second passage branching out into a plurality of passageways in a midstream portion thereof, downstream ends of these passageways being connected to portions in an upstream end of the lip part, respectively; and a temperature controller configured to locally control a temperature of a midstream portion of at least one of the passageways in order to control a flow rate of the second molten resin in the passageway.

A second aspect of the present invention is the sheet forming die according to the first aspect, which further includes a tubular restrictor constituting member formed as a body divided from the sheet forming die, the restrictor constituting member being provided in a midstream portion of at least one of the passageways. Furthermore, in the sheet forming die, the temperature controller is a unit configured to change a temperature of the restrictor constituting member.

A third aspect of the present invention is the sheet forming die according to the second aspect, in which: the sheet forming die is configured by including a die main body and a connection block, the passages are formed so as to extend from the connection block through the die main body, the lip part is formed in the die main body, the second passage branches out in the connection block, the restrictor constituting member is set in a connection portion of the die main body and the connection block, and the restrictor constituting member is configured so as to be mounted integrally with the die main body and the connection block when the connection block is mounted on the die main body.

A fourth aspect of the present invention is a sheet forming die: which receives a first molten resin supplied from a first resin extruder; which receives a second molten resin supplied from a second resin extruder; and which forms a sheet-shaped resin-made product by discharging the first molten resin and the second molten resin from a lip gap. The sheet forming die includes: a first passage provided to flow the supplied first molten resin up to an upstream end of a resin supplying passage located upstream of a lip part located upstream of the lip gap; a second passage provided to flow the supplied second molten resin up to the resin supplying passage, the second passage branching out into a plurality of passageways in a midstream portion thereof, downstream ends of these passageways being connected to portions in an upstream end of the resin supplying passage, respectively; and a temperature controller configured to locally control a temperature of a midstream portion of at least one of the passageways in order to control a flow rate of the second molten resin in the passageway.

A fifth aspect of the present invention is the sheet forming die according to the fourth aspect, which further includes a tubular restrictor constituting member formed as a body divided from the sheet forming die, the restrictor constituting member being provided in a midstream portion of at least one of the passageways. Furthermore, in the sheet forming die, the temperature controller is a unit configured to change a temperature of the restrictor constituting member.

A sixth aspect of the present invention is the sheet forming die according to the fifth aspect, in which: the sheet forming die is configured by including a die main body, a feed block connected to the die main body, and a connection block connected to the feed block, the passages are formed so as to extend from the connection block to the feed block, the resin supplying passage is formed so as to extend from the feed block through the die main body, the lip part is formed in the die main body, the second passage branches out in the connection block, the restrictor constituting member is set in a connection portion of the feed block and the connection block, and the restrictor constituting member is configured so as to be mounted integrally with the feed block and the connection block when the connection block is mounted on the feed block.

A seventh aspect of the present invention is a sheet forming die: which receives a molten resin supplied from a resin extruder; and which forms a sheet-shaped resin-made product by discharging the supplied molten resin from a lip gap. The sheet forming die includes: a passage provided to flow the supplied molten resin up to the lip gap, the passage branching out into multiple passageways in a midstream portion thereof, downstream ends of the passageways being connected to portions located upstream of the lip gap, respectively; a tubular restrictor constituting member formed as a body separated from the sheet forming die, the restrictor constituting member being provided in a midstream portion of at least one of the passageways; and a temperature controller configured to control a temperature of the restrictor constituting member in order to control a temperature of a restrictor of the restrictor constituting member.

An eighth aspect of the present invention is a sheet forming die: which receives a molten resin supplied from a resin extruder; and which forms a sheet-shaped resin-made product by discharging the supplied molten resin from a lip gap. The sheet forming die includes: a passage provided to flow the supplied molten resin up to the lip gap; a tubular restrictor constituting member formed as a body separated from the sheet forming die, the restrictor constituting member being provided in a midstream portion of the passage; and a temperature controller configured to control a temperature of the restrictor constituting member in order to control a temperature of a restrictor of the restrictor constituting member.

A ninth aspect of the present invention is a sheet forming method carried out by use of the sheet forming die according to any one of the first aspect to the eighth aspect.

The present invention provides the sheet forming die and the sheet forming method using the sheet forming die, in which a sheet-shaped resin-made product is formed by: receiving the first molten resin supplied from the first resin extruder; receiving the second molten resin supplied from the second resin extruder; and discharging the first molten resin and the second molten resin from the lip gap. Accordingly the present invention is effective in finely controlling the flow rates of the respective divided flows of the molten resin with precision.

DETAILED DESCRIPTION OF THE PREFERRED EMBODIMENTS

There will be detailed below the preferred embodiments of the present invention with reference to the accompanying drawings. Like members are designated by like reference characters.

Figure 1:
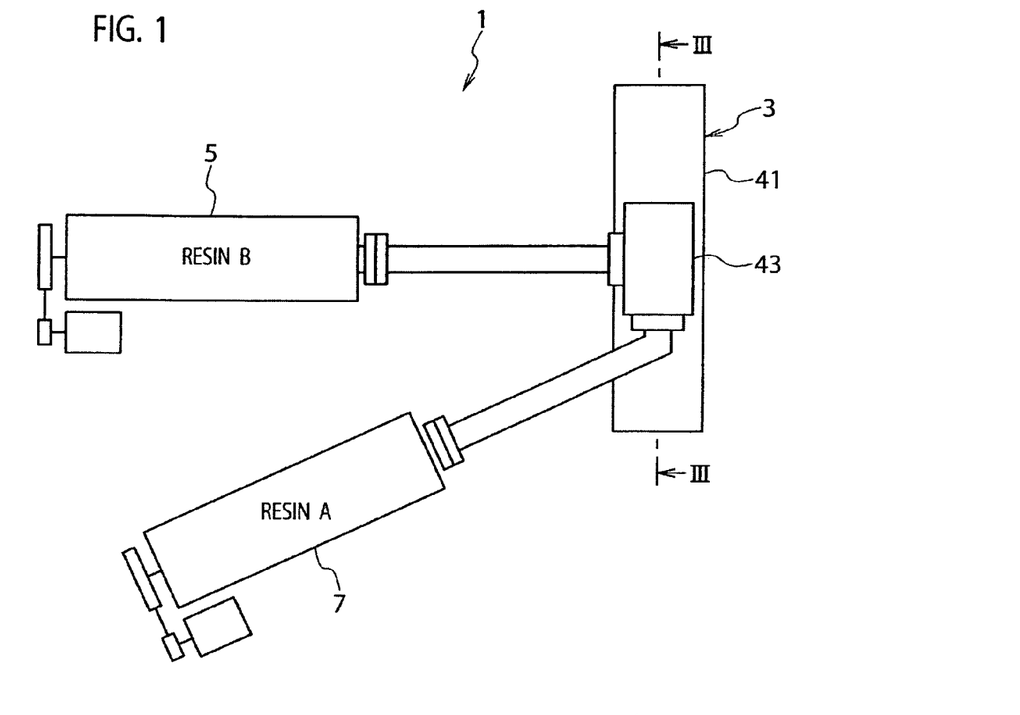
FIG. 1 is a plan view showing a schematic configuration of a sheet forming apparatus according to an embodiment of the present invention.
Figure 2:
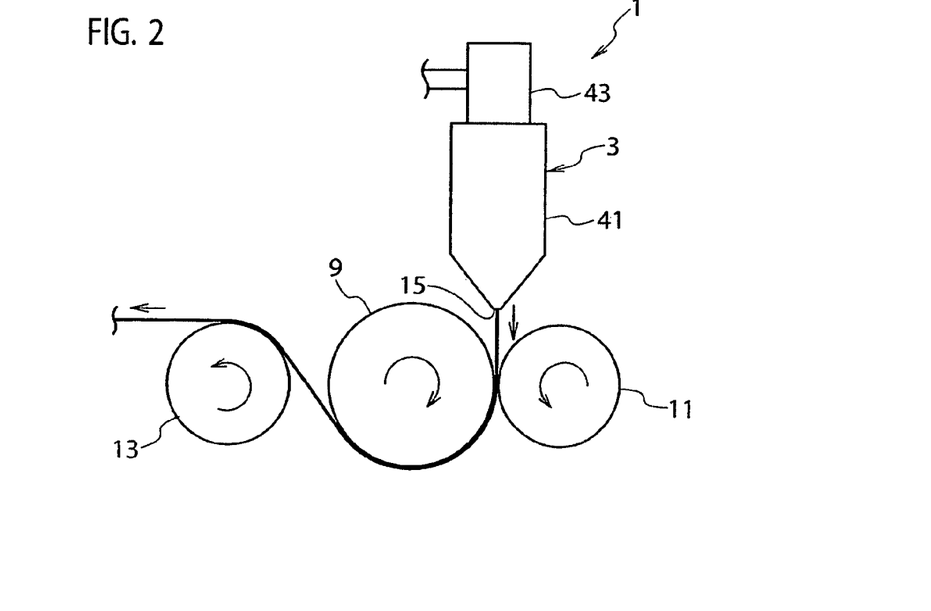
FIG. 2 is a side view showing the schematic configuration of the sheet forming apparatus.
Figure 3:
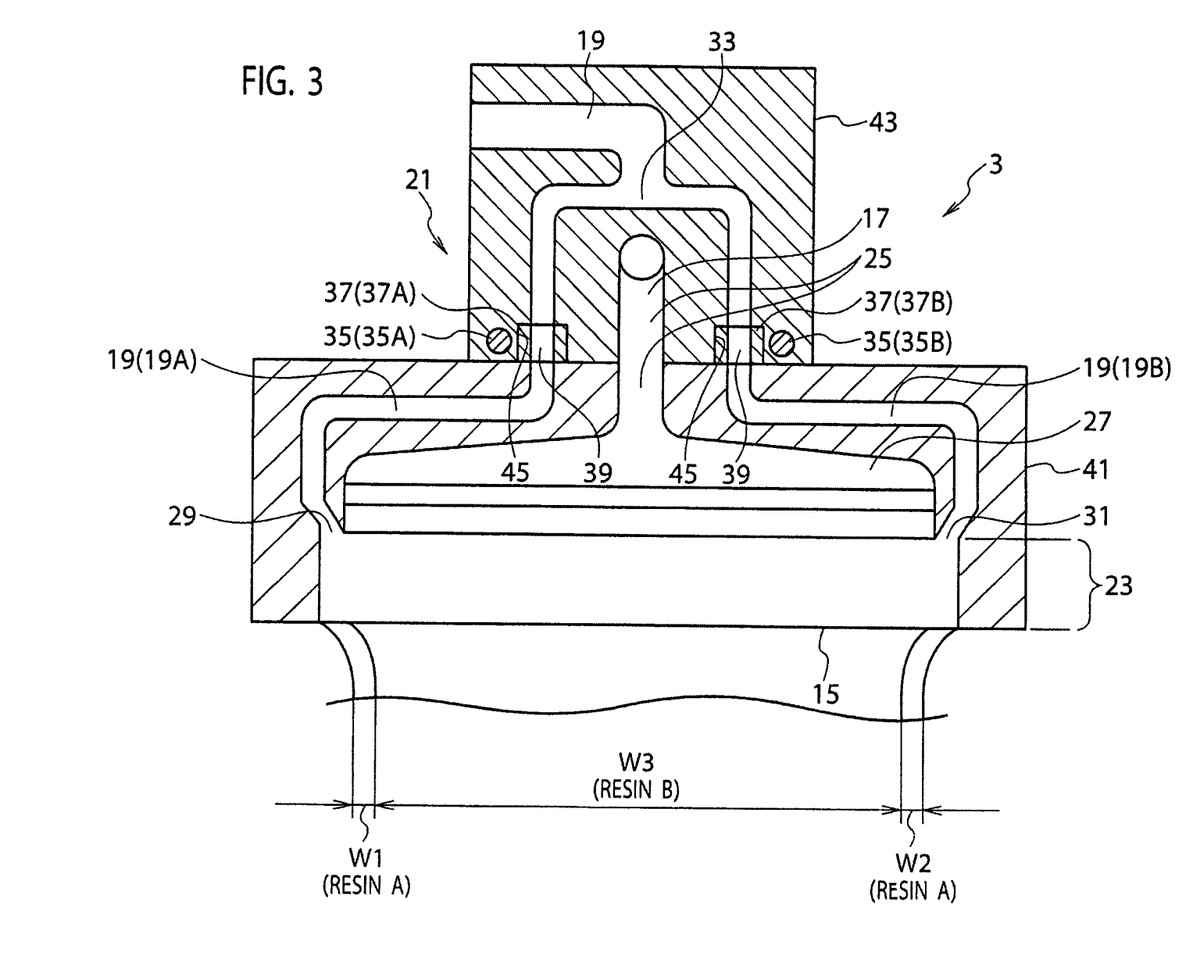
FIG. 3 is a diagram showing a cross-section taken along the III-III line of FIG. 1, or a cross-section of a sheet forming die.

FIG. 1 is a plan view showing a schematic configuration of a sheet forming apparatus 1 according to an embodiment of the present invention. FIG. 2 is a side view showing the schematic configuration of the sheet forming apparatus 1. FIG. 3 is a diagram showing a cross-section taken along the III-III line of FIG. 1, or a cross-section of a sheet forming die 3.

The sheet forming apparatus 1 is configured by including: the sheet forming die 3; a single first resin extruder 5 configured to supply the sheet forming die 3 with a molten resin (first molten resin) B resulting from being heated; and a single second resin extruder 7 configured to supply the sheet forming die 3 with a molten resin (second molten resin) A resulting from being heated.

The molten resins supplied to the sheet forming die 3 is extruded in the form of a sheet from the sheet forming die 3. As shown in FIG. 2, the extruded sheet then is cooled by cooling rollers 9, 11, 13. Note that the resins A, B are thermoplastic resins, for example, and that the resins A, B change their respective fluid properties depending on temperature.

The sheet forming die 3 is a die used for a so-called multi-manifold method. As described above, the sheet forming die 3 is supplied with the first molten resin B from the single first resin extruder 5, and is supplied with the second molten resin A from the single second resin extruder 7. The sheet forming die 3 then discharges the first molten resin B and the second molten resin A from a long, narrow lip gap 15, and thus forms, for example, a multiple-row sheet-shaped resin-made product.

The sheet forming die 3 includes a first passage 17, a second passage 19 and a temperature controller 21. The first passage 17 is provided so as to penetrate the solid portion of the sheet forming die 3 in order that the first molten resin B supplied from the first resin extruder 5 should flow up to an upstream end of a lip part (a lip part through which the molten resin flows to the lip gap 15) 23 located upstream (upstream in the direction in which the molten resin B flows) of the lip gap 15.

In addition, the shape of an upstream-side area 25 of the first passage 17 is different from the shape of a downstream-side area 27 (an area located close to the lip part 23) of the first passage 17. In the upstream-side area 25, the cross-section of the first passage 17 taken along a plane perpendicular to the longitudinal direction of the first passage 17 (a plane expanding in directions orthogonal and transverse to the paper surface of FIG. 3) is formed in a circular shape. In the downstream-side area 27, the cross-section of the first passage 17 taken along the plane perpendicular to the longitudinal direction of the first passage 17 is formed in a narrow long rectangular shape.

The width of this narrow long rectangular cross-section (a dimension of the cross-section extending in the direction transverse to the paper surface of FIG. 3) is slightly less than the width of the lip gap 15. The thickness of this narrow long rectangular cross-section (a dimension of the cross-section extending in the direction orthogonal to the paper surface of FIG. 3) is slightly more than the gap interval of the lip gap 15. Note that in the downstream-side area 27 of the first passage 17, the thickness thereof becomes progressively smaller toward the downstream side from the upstream side. However, the thickness is not smaller than the gap interval of the lip gap 15. Furthermore, the thickness of the upstream end of the downstream-side area 27 is almost equal to that of the inner diameter of the upstream-side area 25.

The second passage 19 is provided so as to penetrate the solid portion of the sheet forming die 3 in order that the supplied second molten resin A should flow up to the lip part 23. The second passage 19 branches out into multiple (for instance, 2) passageways in midstream. Downstream ends (ends located downstream in the flowing direction of the molten resin) 29, 31 of these passageways branched off from the second passage 19 are connected to the respective portions in an upstream end of the lip part 23. Note that a location to which the downstream end 29 is connected and a location to which the downstream end 31 is connected are spaced apart from each other. For example, the location to which the downstream end 29 is connected is situated in one side edge portion of the lip part 23 in the width direction, and the location to which the downstream end 31 is connected is situated in the other side edge portion of the lip part 23 in the width direction.

The cross-section of the second passage 19 taken along a plane perpendicular to the longitudinal direction of the second passage 19 is formed in a circular shape. In addition, the passageways 19A, 19B into which the second passage 19 branches out are symmetrical in the sheet forming die 3, for example, as shown in FIG. 2 in a section located downstream of an area 33 in which the second passage 19 branches out into the passageways 19A, 19B.

The cross-section of the lip part 23 taken along a plane perpendicular to a direction in which the passages of the molten resins extend (the plane expanding in the directions orthogonal and transverse to the paper surface of FIG. 3) is formed in a narrow long rectangular shape. The width of the rectangular cross-section of the lip part 23 (a dimension of the cross-section extending in the direction transverse in FIG. 3) is equal to the width of the lip gap 15, for instance. In addition, in the upstream end of the lip part 23, the thickness of the rectangular cross-section of the lip part 23 (a dimension of the cross-section extending in the direction orthogonal to the paper surface of FIG. 3) is equal to the width of the downstream end of the downstream area 27 of the first passage 17. The thickness thereof is progressively reduced toward the downstream side, and eventually equal to the thickness of the lip gap 15. Note that the internal diameter of each of the passageways 19A, 19B into which the second passage 19 branches out is almost equal to the thickness of the corresponding upstream end of the lip part 23.

Since the sheet forming die 3 is configured as describe above, the resins discharged from the lip gap 15 have a sheet-shaped multiple-row structure in which: the first resin B exists in the center portion in the width direction; and the second resin A exists in each of the two side edge portions in the width direction.

The temperature controller 21 is provided in the midstream of each of the passageways 19A, 19B into which the second passage 19 branches out (an area in which the cross-section of each passageway taken along the plane perpendicular to the longitudinal direction of the passageway is formed in a circular shape) in order to control the flow rate of the second molten resin A in each passageway into which the second passage 19 branches out. In addition, the temperature controller 21 is configured to locally control the temperature of the midstream portion of each passageway.

The temperature controller 21 is formed of thermal conductors such as heaters 35 and double-pipe-structure heating medium pipes. (In this respective, each double-pipe-structure heating medium pipe has an external pipe and an internal pipe which is placed inside the external pipe. Each double-pipe-structure heating medium pipe is configured so that a heat transfer medium can flow first inside the internal pipe and subsequently in the interstice between the inner wall of the external pipe and the outer wall of the internal pipe, or so that a heat transfer medium can flow first in the interstice between the inner wall of the external pipe and the outer wall of the internal pipe and subsequently inside the internal pipe.)

Temperature sensors (not illustrated) are provided in vicinities of the heaters 35. Temperatures detected by these temperature sensors are inputted into controllers (not illustrated). These controllers perform feedback control of the temperatures of the heaters 35, respectively. FIG. 3 shows that the heaters 35 (35A, 35B) are respectively provided to the two passageways 19A, 19B, so that these controllers are able to independently control the temperatures of the respective heaters 35A, 35B. Instead, however, the temperature controller 21 may be configured so that at least one of the passageways 19A, 19B is provided with such a thermal conductor.

Furthermore, the temperature controller 21 may be configured by including passages each in which a coolant flows in place of or in addition to the thermal conductors. In this case, the passages are formed in vicinities of the heaters 35 shown in FIG. 3, respectively. Thus, midstream areas of the passageways 19A, 19B are cooled locally by their respective coolants. The coolant is assumed to be supplied from an apparatus provided outside the sheet forming die 3, and that the coolant returns to the apparatus after flowing in the corresponding passage.

Moreover, the sheet forming die 3 includes tubular restrictor constituting members 37 (37A, 37B) which constitute fixed-type restrictors. The restrictor constituting members 37 are formed as bodies separated (divided) from the solid portion of the sheet forming die 3. The restrictor constituting members 37 are provided in midstream areas of the respective passageways 19A, 19B into which the second passage 19 branches out, in order to control the flow rate of the second molten resin A in each of the passageways 19A, 19B, and so as to be integrated with the sheet forming die 3.

Although FIG. 3 shows that the restrictor constituting members 37 (37A, 37B) are respectively provided in the two passageways 19A, 19B, the sheet forming die 3 may be configured so that at least one of the passageways 19A, 19B includes a restrictor constituting member 37.

As described above, the temperature controller 21 is configured by including the heat generators such as the heaters 35 and/or the heat absorber such as the coolant passages, which are provided in the vicinities of the restrictor constituting members 37. The temperature controller 21 is configured to mainly control the temperatures of the respective restrictor constituting members 37. Note that, for the purpose of preventing the temperatures of the molten resins A, B from decreasing, the sheet forming die 3 as a whole is heated by heating means (not illustrated) in order to be kept at a predetermined temperature. The temperature controller 21 is configured to locally change the predetermined temperature in each of the restrictor constituting members 37.

Figure 4:
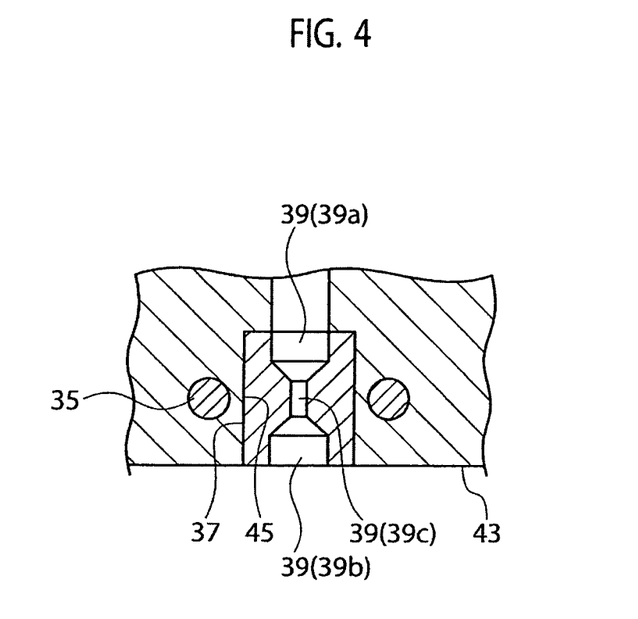
FIG. 4 is a diagram showing a modification of a reduction constituting member.

The restrictor constituting members 37 are shaped like a tube (for instance, a cylinder). Consequently, the through-holes 39 of the respective restrictor constituting members 37 are shaped like a column. The second molten resin A flows in each of these through-holes 39. The inner diameters of the through-holes 39 are equal to or smaller than the inner diameters of the passageways 19A, 19B, respectively. In addition, the inner diameters of parts of the through-holes 39 of the restrictor constituting members 37 may be further smaller, respectively. In other words, as shown in FIG. 4, the through-hole 39 of each restrictor constituting member 37 may be configured by including an upstream-side larger-diameter part 39a, a downstream-side larger-diameter part 39b and a smaller-diameter part 39c which is sandwiched between the larger-diameter part 39a and the larger-diameter part 39b. In this case, it is desirable that a truncated conical space should be formed between the larger-diameter part 39a and the smaller-diameter part 39c so that the inner diameter of the larger-diameter part 39a is progressively reduced toward the smaller-diameter part 39c. Furthermore, it is desirable that a truncated conical space should be formed between the smaller-diameter part 39c and the larger-diameter part 39b so that the inner diameter of the smaller-diameter part 39c is progressively increased toward the larger-diameter part 39b.

Note that in the tubular restrictor constituting members 37, materials may be adopted, which are formed in a predetermined shape such as a triangular pole or a square pole, and which are provided with their respective through-holes (each of the holes penetrating the material in its axial direction). Furthermore, the through-holes do not have to be shaped like a column. The through-holes may alternatively be formed in a predetermined shape such as a triangular pole or a square pole.

The temperature controller 21 is configured to be capable of controlling the flow rate of the second molten resin A in each restrictor constituting member 37 in a following manner. The temperature controller, 21 changes the temperature of each restrictor constituting member 37 (mainly the temperature of the smaller-diameter part 39c if the smaller-diameter part 39c exists) so as to change the temperature of the second molten resin A in the restrictor constituting member 37. In this way, the temperature controller 21 controls the viscosity of the second molten resin A. This viscosity control leads to the flow rate control. Also, the temperature controller 21 is configured to be capable of controlling the flow rate of the second molten resin A in each restrictor constituting member 37 by changing the cross-sectional area of the restrictor of the tubular restrictor constituting member 37 (the area of a cross-section taken along a plane orthogonal to the flowing direction of the molten resin: mainly the area of a cross-section of the smaller-diameter part 39c if the smaller-diameter part 39c exists).

Note that the temperature controller 21 may be formed of ring-shaped conductors (for instance, the heaters 35) so that, as shown in FIG. 4, each restrictor constituting member 37 is placed inside its corresponding heater 35.

Furthermore, the sheet forming die 3 is configured by including a die main body 41 and a connection block 43 which is detachably connected to the die main body 41 in an easy manner by use of fasteners such as bolts.

The passages 17 and 19 are formed so as to extend from the connection block 43 to the die main body 41. The lip part 23 is formed in the die main body 41. The second passage 19 branches out into the passageways in the solid portion of the connection block 43.

The restrictor constituting members 37 are provided in a connection area of the die main body 41 and the connection block 43. The restrictor constituting members 37 can be freely detached from the connection block 43 and the die main body 41 when the connection block 43 is detached from the die main body 41. In addition, the restrictor constituting members 37 can be integrally set onto the die main body 41 and the connection block 43 when the connection block 43 is integrally placed on the die main body 41.

An inlet and part of the upstream-side area 25 of the first passage 17 are formed in the connection block 43. A remaining part of the upstream-side area 25 of the first passage 17, the downstream-side area 27 of the first passage 17, the lip part 23 and the lip gap 15 are formed in the die main body 41.

Moreover, an inlet of the second passage 19 and a branching part 33 of the second passage 19 are formed in the connection block 43. The downstream-side areas of the second passage 19 are formed in the die main body 41.

Column-shaped concave parts 45 are formed in the respective downstream ends of the second passage 19 in the connection block 43. The outer diameter of each cylinder-shaped restrictor constituting member 37 is slightly smaller than the inner diameter of the corresponding column-shaped concave part 45. The length of each restrictor constituting member 37 (the dimension of each restrictor constituting member 37 in the vertical direction in FIG. 3) is almost equal to the depth of the corresponding concave part 45. The heater 35 is provided in the connection block 43 near the corresponding restrictor constituting member 37. Assumption is made that, in a case where each restrictor constituting member 37 is formed in a shape other than the cylinder, the shape of the corresponding concave part 45 is formed in a shape almost the same as the external shape of the restrictor constituting member 37.

When the die main body member 41 and the connection block 43 are being detached from each other, and when the connection block 43 is connected to the die main body 41 with the restrictor constituting members 37 being inserted in the corresponding concave parts 45, the restrictor constituting members 37 are held between the die main body 41 and the connection block 43. Thereby, the restrictor constituting members 37 are placed so as to be integrated with the die main body 41 and the connection block 43.

Note that, for instance, as shown in Japanese Patent Application Publication No. 2006-231788, the lip gap 15 in the die main body part 41 is configured to be adjustable by use of lip adjustment bolts (not illustrated in the drawings attached to this application) which are provided in predetermined intervals in the width direction of the lip gap 15.

Next, descriptions will be provided for how the sheet forming apparatus 1 operates.

As an initial condition, an assumption is made that: the restrictor constituting members 37 each with a predetermined cross-sectional area are used; the sheet forming die 3 including the restrictor constituting members 37 is kept at a predetermined temperature; and the lip gap 15 is adjusted by use of the lip adjustment bolts. In addition, an objective is assumed to obtain a sheet with a predetermined thickness, which includes the second resin A with a predetermined width in each of the two side edge portions of the sheet in the width direction, after cooled by the cooling rollers 9, 11, 13.

After the extruders 5, 7 supply their respective molten resins B. A to the sheet forming die 3 under control of the controller while the sheet forming apparatus 1 is in the initial condition, the molten resins A, B are extruded to be multiple resin rows from the lip gap 15 in the sheet forming die 3. Subsequently, the extruded resins are cooled by the cooling rollers 9, 11, 13. Thereby, a sheet is formed with the predetermined thickness, and with a predetermined width.

With regard to a sheet preceding the thus-formed sheet, or a sheet in which a neck-in phenomenon occurs as shown in FIG. 3, if the dimension (width dimension of the second resin A) W1 on the left in FIG. 3 and the dimension (width dimension of the second resin A) W2 on the right in FIG. 3 are not equal to each other, the restrictor constituting members 37 are heated by use of the respective heaters 35 as needed, and thereby the left-side dimension W1 and the right-side dimension W2 are equalized to each other. Specifically, if the left-side dimension W1>the right-side dimension W2, the restrictor constituting member 37B on the right side is heated by use of the heater 35B on the right side. Thereby, the temperature of the molten resin A passing the restrictor constituting member 37B on the right side is raised, and thus the flow rate of the molten resin A passing therethrough is slightly increased.

If the left-side dimension W1 and the right-side dimension W2 are not equalized to each other through the temperature control made by the heater 35, the molten resins A, B are stopped being supplied to the sheet forming die 3. Subsequently, one of the restrictor constituting members 37 is replaced with a restrictor constituting member having a passage whose cross-sectional area is different (for instance, a restrictor constituting member having a smaller-diameter part 39c, shown in FIG. 4, whose inner diameter is different). Thereby, the supply of the molten resins A, B to the sheet forming die 3 is resumed, and the temperature of the restrictor constituting member 37 is controlled as needed.

In the sheet forming die 3, the flow rate of the second molten resin A in each of the passageways 19A, 19B can be finely controlled at a safe place remote from the sheet forming die 3 not only while the sheet forming die 3 is being stopped, but also while the sheet forming die 3 is in operation. This is because the temperature controller 21 is configured to locally control the temperatures of the respective passageways 19A, 19B. In addition, the sheet forming die 3 is configured to cause the second molten resin A to flow together with the first molten resin B smoothly. That is because the downstream ends 29, 31 of the passageways 19A, 19B are connected to the portions in an upstream end of the lip part 23, so that the second molten resin A flows together with the first molten resin B before the first molten resin B is formed into a sheet after completing its expansion (before the first molten resin B is formed in a shape coinciding with the cross-section of the lip gap 15).

Consequently, the sheet forming die 3 is capable of finely controlling the flow rates of the divided flows of the second molten resin A with precision, and of equalizing the flow rates of divided flows of the second molten resin A in the passageways 19A and 19B. Furthermore, the sheet forming die 3 makes it easy to equalize the width W1 and the width W2 of the second resin A shown in FIG. 3.

Moreover, because the temperature controller 21 locally controls the temperatures of the respective passageways 19A, 19B, the flow rates of the divided flows of the second molten resin A are controlled in quick response.

Additionally, each restrictor constituting member 37 shaped like a tube is capable of evenly heating or cooling the second resin A passing through the inside thereof by surrounding the resin A with the tubular body. Accordingly, the sheet forming die 3 is capable of finely controlling the flow rates of the respective divided flows of the second molten resin A more precisely than the conventional die does. In addition, because each restrictor constituting member 37 is formed as a body separated (divided) from the sheet forming die 3, the heat capacity of the restrictor constituting member 37 is smaller. This makes it easy to control the temperature of each restrictor constituting member 37 by use of the temperature controller 21, and concurrently makes the temperature of the second passage 19 excluding the restrictor constituting member 37 hard to change the temperature. Accordingly, the sheet forming die 3 is capable of finely controlling the temperatures of the respective divided flows of the second molten resin A with precision. In addition, the cross section of the restrictor in the restrictor constituting member 37 is easily changed with the temperature control. Furthermore, because each restrictor constituting member 37 is shaped like a cylinder, the constitution of the restrictor constituting member 37 is simplified. Concurrently, fine backwater is less likely to be generated while the second molten resin A is flowing.

Moreover, because each of the restrictor constituting members 37 is provided between the die main body 41 and the connection block 43, the sheet forming die 3 allows the restrictor constituting members 37 to be easily replaced with another ones. If one of the currently-provided restrictor constituting members 37 is replaced with another restrictor constituting member 37 having a different cross-section, the sheet forming die 3 makes it possible to easily control the flow rate of the second molten resin A in a wide range even though the restrictors of the fixed type are used as the restrictor constituting members 37. In addition, the temperature controller 21 is located farther from the lip part 23 and the lip gap 15 than the temperature controller described in Japanese Patent Application Publication No. Hei. 6-91719 is. Accordingly, the lip part 23 and the lip gap 15 are less influenced by the temperature controller 21. For this reason, the temperatures of the lip part 23 and the lip gap 15 change little. Accordingly, the sheet forming die 3 is capable of forming a sheet in a correct shape Here, descriptions will be provided for a sheet forming die 3a used for a feed block method.

Figure 5:
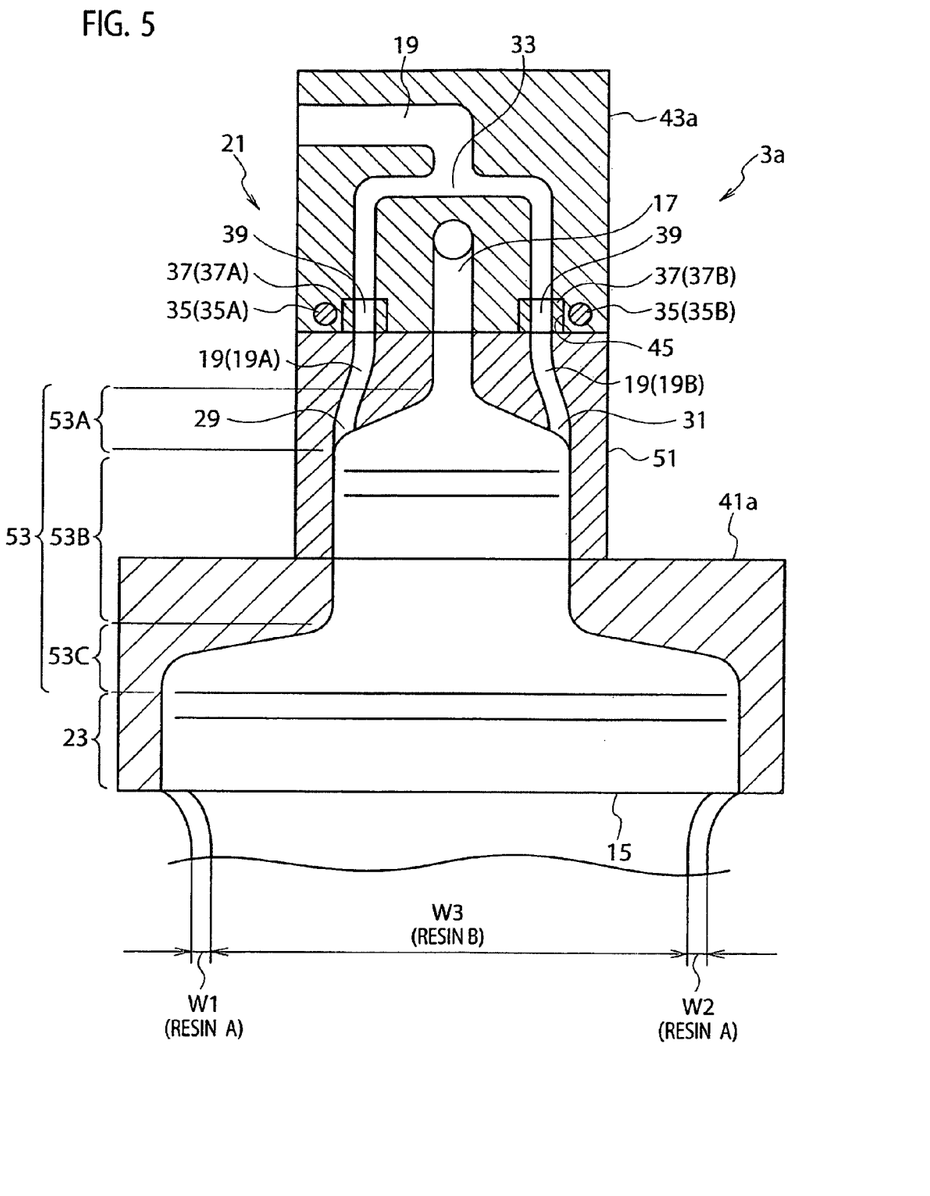
FIG. 5 is a diagram showing a schematic configuration of the sheet forming die, and corresponding to FIG. 3.

FIG. 5 is a diagram showing a schematic configuration of the sheet forming die 3a, and corresponds to FIG. 3.

The sheet forming die 3a in FIG. 5 is different from the sheet forming die 3 shown in FIG. 3 in that a feed block 51 is provided between a die main body 41a and a connection block 43a, and in that a resin supplying passage 53 is provided in the feed block 51 and the die main body 41a. The other configuration in the sheet forming die 3a is almost the same as that of the sheet forming die 3. The sheet forming die 3a brings about almost the same effect as the sheet forming die 3 does.

Specifically, the first passage 17 of the sheet forming die 3a is formed in order to flow the first molten resin to an upstream end of the resin supplying passage 53 located upstream of the lip part 23 located upstream of the lip gap 15. The second passage 19 is provided in order to flow the second molten resin to the resin supplying passage 53. The second passage 19 branches out into multiple passageways in the midstream portion thereof. The downstream ends 29, 31 of these passageways are connected to portions in an upstream end of the resin supplying passage 53, respectively.

The sheet forming die 3a is configured by including: a die main body 41a; the feed block 51, for instance, detachably connected to this die main body 41a; and the connection block 43a, for instance, detachably connected to this feed block 51.

The passage 17, 19 are formed so as to extend from the connection block 43a to the feed block 51. The resin supplying passage 53 is formed so as to extend from the feed block 51 to the die main body 41a. The lip part 43 is formed in the die main body 41a. The second passage 19 branches out inside the connection block 43a.

The restrictor constituting members 37 are set in a connection area of the feed block 51 and the connection block 43a. The restrictor constituting member 37 is configured to be mounted integrally with the feed block 51 and the connection block 43a when the connection block 43a is mounted on the feed block 51.

The resin supplying passage 53 is formed in a die main body 41a-side portion of the feed block 51 and a feed block 51-side portion of the die main body 41a. In addition, the resin supplying passage 53 is configured by including an upstream portion 53A, a midstream portion 53B and a downstream portion 53c. The width of the midstream portion 53B is less than the width of the lip part 23.

Furthermore, the upstream portion 53A communicates with the midstream portion 53B in a way that the resin supplying passage 53 becomes progressively wider in the upstream portion 53A. The downstream portion 53C communicates with the lip part 23 in a way that the resin supplying passage 53 becomes progressively wider in the downstream portion 53C.

One of the passageways 19A is connected to one side edge portion of the resin supplying passage 53 in the width direction in the boundary area of the upstream portion 53A and the midstream portion 53B of the resin supplying passage 53. The other of the passageways 19B is connected to the other side edge portion of the resin supplying passage 53 in the width direction in the boundary area of the upstream portion 53A and the midstream portion 53B of the resin supplying passage 53.

Note that the passageways 19A, 19B are located inside the midstream portion 53B in the width direction of the resin supplying passage 53. In addition, the passageways 19A, 19B extend in a direction in which the resin flows (in a direction in which the resin flows in the midstream portion 53B and the lip gap 15 of the resin supplying passage 53), and eventually continue to the resin supplying passage 53.

The foregoing descriptions have been provided exemplifying the case where the multiple-row sheet having the second resin A located in the two side ends of the first resin B is formed. Nevertheless, a case where a multi-row sheet having an alternate series of the first resin B and the second resin A in the sheet width direction is formed is conceivable in the similar manner. For instance, a sheet (a sheet having the width W3 of the first resin B located in the center portion thereof, and having the widths W1 and W2 of the second resin A located in the two side edge portions thereof, respectively) shown in the lower portion of FIG. 3 may have the second resin A with a predetermined width which replaces part of the center portion of the first resin B.

Moreover, the foregoing descriptions have been provided exemplifying the case where the two resins are adopted. Nevertheless, a case where three resins or more are adopted is conceivable in the similar manner.

Furthermore, the foregoing descriptions have been provided exemplifying the case where the multi-row sheet is formed. Nevertheless, a case where a multi-layered sheet (a sheet having different types of layers stacked one another in the sheet thickness direction orthogonal to the paper surface of FIG. 3) is formed is conceivable in the similar manner.

Note that the above-described sheet forming die 3 is an example of a sheet forming die which receives a molten resin supplied from a resin extruder; and which forms a sheet-shaped resin-made product by discharging the supplied molten resin from a lip gap. The sheet forming die includes: a passage provided to flow the supplied molten resin up to the lip gap, the passage branching out into multiple passageways in a midstream portion thereof, downstream ends of the passageways being connected to portions located upstream of the lip gap, respectively; a tubular restrictor constituting member formed as a body separated from a solid portion of the sheet forming die, the restrictor constituting member being provided in a midstream portion of at least one of the passageways; and a temperature controller configured to control a temperature of the restrictor constituting member in order to control a temperature of a restrictor of the restrictor constituting member.

The present invention is not limited to the foregoing descriptions or the foregoing explanation of the embodiment of the present invention. The present invention can be carried out in other various modes by modifying the present invention depending on the necessity.

It should be noted that all the contents of Japanese Patent Application No. 2008-106912 (filed on Apr. 16, 2008) are fully incorporated in the description of the present patent application by reference.

What is claimed is:

1. A sheet forming die comprising:
a die main body;
a connection block;
a first resin extruder configured to supply a first molten resin;
a second resin extruder configured to supply a second molten resin;
a lip gap formed in the die main body and configured to discharge the first molten resin and the second molten resin to form a sheet-shaped resin-made product;
a first passage provided to flow the supplied first molten resin up to an upstream end of a lip part located upstream of the lip gap, the first passage extending from the connection block through the die main body;
a second passage provided to flow the supplied second molten resin up to the lip part, the second passage extending from the connection block through the die main body, the second passage branching out in the connection block into two passageways in a midstream portion thereof, downstream ends of these passageways being connected to portions in an upstream end of the lip part, respectively;
two temperature controllers, each controller configured to locally control a temperature of a midstream portion of a corresponding one of the two passageways in order to control flow rates of the second molten resin in the two passageways; wherein the die main body is configured so that one of the second molten resins flows together with the first molten resin at one of a pair of edge ends of the first molten resin in a width direction of the first molten resin and another of the second molten resins flows together with the first molten resin at another of the pair of edge ends of the first molten resin in the width direction of the first molten resin to form the sheet-shaped resin-made product; and
two tubular restrictor constituting members provided in midstream portions of each of the two passageways in a connection portion of the die main body and the connection block and formed as bodies separated from the sheet forming die and separated from portions of each of the two passageways that are upstream of the temperature controllers, wherein
each of the restrictor constituting members is formed with a through-hole configured to receive a flow of the second molten resin and configured so as to be mounted integrally with the die main body and the connection block when the connection block is mounted on the die main body;
each of the through-holes is configured by two larger diameter parts and a smaller diameter part which is sandwiched between the two larger diameter parts;
each of the temperature controllers is ring shaped and is located around a periphery of the smaller diameter part of the through-hole of the corresponding restrictor constituting member;
each of the temperature controllers is configured to control a flow rate of the second molten resin by changing a temperature of the corresponding restrictor constituting member, thereby changing a temperature of the second molten resin in the corresponding restrictor constituting member so that a viscosity of the second molten resin is controlled; and
each of the two passageways between each of the restrictor constituting members and each of the downstream ends of the passageways connected to portions in the upstream end of the lip part is located in the die main body.

2. A sheet forming die comprising:
a die main body;
a connection block;
a resin extruder configured to supply a molten resin;
a lip gap formed in the die main body and configured to discharge the supplied molten resin to form a sheet-shaped resin-made product;
a passage provided to flow the supplied molten resin up to the lip gap, the passage branching out into multiple passageways in the connection block in a midstream portion of the passage, downstream ends of the passageways being connected to portions located upstream of the lip gap, respectively, the passage extending from the connection block through the die main body, a second passage in the die main body providing a first molten resin up to the lip gap;

a plurality of tubular restrictor constituting members, each tubular restrictor constituting member formed as a body separated from the sheet forming die, each restrictor constituting member being provided in a midstream portion of one of the passageways in a connection portion of the die main body and the connection block, wherein a restrictor constituting member is provided in a midstream portion of each of the multiple passageways; and a temperature controller configured to control a plurality of temperatures, each temperature being a temperature of one of the plurality of restrictor constituting members in order to control a temperature of a plurality of restrictors, each restrictor being a restrictor of one of the plurality of restrictor constituting members, wherein each restrictor constituting member is formed with a through-hole configured to receive a flow of the molten resin and configured so as to be mounted integrally with the die main body and the connection block when the connection block is mounted on the die main body;

each through-hole is configured by two larger diameter parts and a smaller diameter part which is sandwiched between the two larger diameter parts;

the temperature controller comprises a plurality of ring shaped heaters, each of the heaters being located around a periphery of the smaller diameter part of the through-hole of a corresponding restrictor constituting member;

each restrictor constituting member is formed as a body separated from the sheet forming die and separated from a portion of the corresponding passageway that is upstream of the corresponding ring shaped heater;

the temperature controller is configured to control a flow rate of the molten resin by changing a temperature of at least one of the restrictor constituting members, thereby changing a temperature of the molten resin in the at least one restrictor constituting member so that a viscosity of the molten resin is controlled; wherein the die main body is configured so that the molten resin in one of the multiple passageways flows together with the first molten resin at one of a pair of edge ends of the first molten resin in a width direction of the first molten resin and the molten resin in another of the multiple passageways flows together with the first molten resin at another of the pair of edge ends of the first molten resin in a width direction of the first molten resin to form the sheet-shaped resin-made product; and each of the passageways between each of the restrictor constituting members and each of the downstream ends of the passageways connected to portions upstream of the lip gap is located in the die main body.

* * * * *